United States Patent [19]
Boggs et al.

[11] 3,910,128
[45] Oct. 7, 1975

[54] TRACK ROLLER HAVING RESILIENT MOUNTED TREADS AND THREADED-ON RETAINERS

[75] Inventors: Roger L. Boggs, East Peoria; Delbert D. Dester, Washington, both of Ill.

[73] Assignee: Caterpillar Tractor Company, Peoria, Ill.

[22] Filed: June 13, 1974

[21] Appl. No.: 479,167

[52] U.S. Cl. ............... 74/230.01; 305/21; 305/27; 305/28
[51] Int. Cl.² .................. F16H 55/36; B62D 55/14
[58] Field of Search............ 280/28.5; 301/114, 9 R; 305/21, 22-28; 74/230.01

[56] References Cited
UNITED STATES PATENTS

| | | | |
|---|---|---|---|
| 2,926,968 | 3/1960 | Toth | 305/27 UX |
| 3,116,957 | 1/1964 | Fikse | 308/103 |
| 3,147,048 | 9/1964 | Johnson et al. | 305/21 X |

*Primary Examiner*—Leonard H. Gerin
*Attorney, Agent, or Firm*—Ralph E. Walters

[57] ABSTRACT

A track roller assembly for use in crawler-type tractors including a shaft adapted to be secured to the track frame of the tractor and a hub journalled on the shaft. The hub has opposite ends externally threaded for receipt of internally threaded retaining caps. The caps engage and locate guide flanges on the hub and, in addition, include inwardly directed surfaces directed toward oppositely facing annular shoulders on the shaft. Thrust bearings are received between the shoulders and the surfaces and radially inner and outer annular seals are disposed about the surfaces to sealingly engage the shaft and the hub respectively.

8 Claims, 1 Drawing Figure

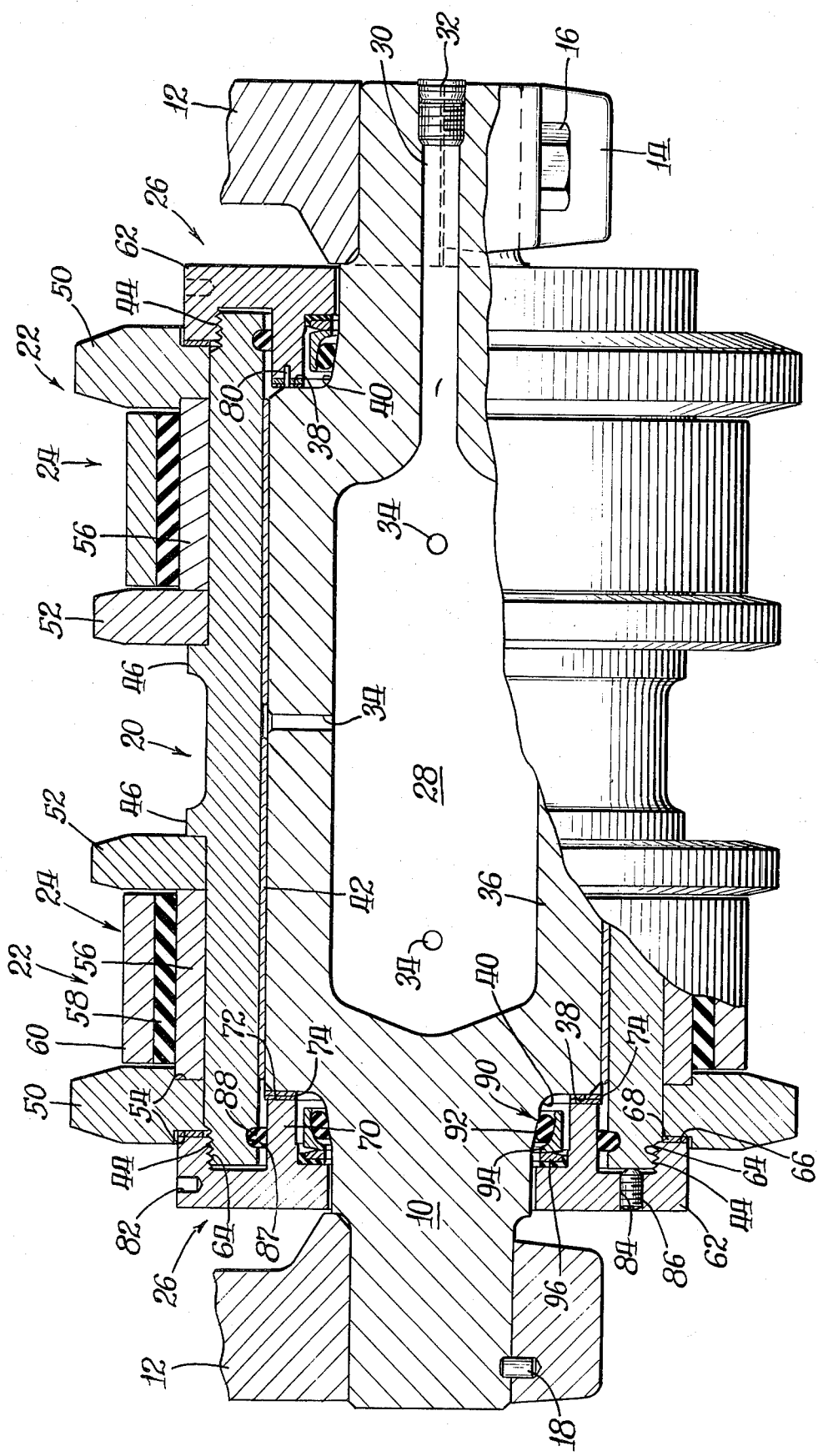

TRACK ROLLER HAVING RESILIENT MOUNTED TREADS AND THREADED-ON RETAINERS

BACKGROUND OF THE INVENTION

This invention relates to track roller assemblies employed in crawler-type tractors. Pertinent prior art includes Deffenbaugh U.S. Pat. No. 2,647,025; Eriksson U.S. Pat. No. 2,804,358; Fikse U.S. Pat. No. 3,116,957; and Tomizawa U.S. Pat. No. 3,580,093.

Track roller assemblies mounted on the underside of the track frames of crawler-type tractors for supporting the lower run of a track chain are subjected to severe abuse even in the course of normal operation due to lateral stresses placed thereon during turning movements and upward thrusts encountered when the track chain passes over uneven terrain. Accordingly, it has been the practice to construct the same of extremely high quality, heat treated material to assure reliability and long service life.

Increasing material and labor costs and material shortages have substantially increased the cost of manufacture of such assemblies as well as the cost of servicing them. In order to overcome manufacturing and servicing difficulties of the foregoing type, it is necessary that roller hub support bearings, guide flanges, thrust bearings and/or seals, be such as to be more economically fabricated and/or have a vastly increased service life with no increase in cost of manufacture and/or be more readily and economically serviced to minimize tractor down time.

SUMMARY OF THE INVENTION

It is the principal object of the invention to provide a new and improved track roller assembly for crawler type tractors. More specifically, it is an object of the invention to provide such a track roller assembly wherein various components may be more economically fabricated; the useful life of various components substantially prolonged without a significant increase in the cost of manufacture; and which may be easily and readily serviced.

An exemplary embodiment of a track roller assembly made according to the invention achieves the foregoing objects by a structure including an elongated shaft which may be secured to the track frame of a crawler-type tractor, which shaft includes oppositely directed, annular shoulders. A hub having threaded ends is journalled on the shaft and, in turn, includes a pair of abutments which serve to locate removable guide flanges thereon.

The removable guide flanges are received on the hub and are symmetrical so that when one surface thereof becomes worn, they may be removed, reversed, and replaced to extend their useful life. In the preferred embodiment, four guide flanges are employed and spacing between the same is maintained by a pair of spacing sleeves received on the hub. Resilient collars are disposed on and peripherally extend about each of the sleeves and they, in turn, receive annular treads thereby providing a resilient mounting of the treads to prolong their useful life.

The guide flanges are retained in place on the hub by means of an internally threaded retaining cap received on each threaded end of the hub. A portion of the cap abuts and locates one of the guide flanges. The end cap is provided with an inwardly directed surface aligned with the annular shoulder on the shaft for essentially engaging the same. A thrust bearing is provided between the shoulder and the surface. Thus, the caps also serve to retain and locate the hub on the shaft.

Radially inner and outer annular seals are disposed about each one of the surfaces of the guide caps for respectively sealingly engaging the shaft and the hub to preclude the entry of foreign material to bearing surfaces.

Other objects and advantages will become apparent from the following specification taken in conjunction with the accompanying drawing.

DESCRIPTION OF THE DRAWING

The FIGURE is a view of a track roller assembly made according to the invention with parts shown in section for clarity.

DESCRIPTION OF THE PREFERRED EMBODIMENT

Referring to the FIGURE, a track roller assembly made according to the invention includes a shaft, generally designated 10, which extends between the rails 12 of a track frame for a crawler-type tractor and is mounted thereon by means of removable caps 14 held in place by bolts 16. A key 18 may be employed to preclude the shaft 10 from rotating relative to the rails 12.

The shaft 10 mounts a hub, generally designated 20, which in turn mounts two pairs of guide flanges, each generally designated 22. Between the guide flanges of each pair 22, a tread assembly, generally designated 24, is received. Retaining means, generally designated 26, are located at opposite ends of the hub 20 to hold the previously described components in assembled relation as illustrated.

Returning to the shaft 10, the same is preferably fabricated in a manner disclosed in the commonly assigned application of Gibble et al, entitled "Formed One-Piece Hollow Shaft," Ser. No. 421,120, filed Dec. 3, 1973, by the extrusion techniques therein described. The same includes a central lubricant-receiving cavity 28 having an inlet conduit 30 extending to one end of the shaft 10 to receive a sealing plug 32. Radially extending bores 34 establish fluid communication between the cavity 28 and the cylindrical outer surface of an enlarged diameter portion 36 of the shaft to permit the flow of lubricant to the interface of the shaft 10 and the hub 20 for lubricating purposes.

The enlarged diameter portion 36 of the shaft 10 is defined by oppositely facing, annular shoulders 38 which, in turn, blend into integrally formed ramps 40 located radially inwardly and axially outwardly of the shoulders 38. The purpose of the shoulders 38 and the ramps 40 will be described in greater detail hereinafter.

The hub 20 is journalled on the enlarged diameter portion 36 of the shaft 10 by means of bushings 42. In addition, the hub 20 has externally threaded ends 44 and axially inwardly located abutments 46 extending radially outwardly, in an annular fashion, on the exterior surface of the hub 20.

Turning now to the guide flange pairs 22, each is comprised of a guide flange 50 and a guide flange 52 which preferably are formed to be symmetrical in cross section as illustrated. The guide flange 50 has identical annular recesses 54 formed adjacent its inner periphery for coaction with a portion of the corresponding one of the tread assembly 24 and retaining means 26. For a more detailed description, reference may be had to the commonly assigned, copending application of Boggs, entitled "Replaceable and Reversible Flanges," filed Dec. 12, 1973 and bearing Ser. No. 424,095.

Because of the symmetrical configuration of the guide flanges 50 and 52, it will be appreciated that when one side of each becomes worn to the point of requiring replacement, the guide flange may be removed, reversed, and replaced to provide a new, unworn side in a position facing the track chain.

As is well known, guide flanges are customarily formed of extremely high quality, heat-treated steel and consequently, are rather expensive. By reason of the foregoing feature, the useful life of each guide flange is approximately doubled at no substantial increase in cost of manufacture.

Each tread assembly 24 includes an annular spacing sleeve 56 which is received between guide flanges 50 and 52 of a corresponding pair with one end entering into the annular notch 54 in the guide flange 50. The outer periphery of each spacing collar 56 mounts a resilient collar 58 formed of any suitable elastomer which extends peripherally about spacing sleeve 56. The width of the collar 58 is somewhat less than the width of the sleeve 56 as is apparent from the Figure. The resilient collar 58, in turn, mounts an annular tread 60 formed of hardened material.

Each pair 22 of guide flanges and each tread assembly 24 is held in assembled relation as illustrated against the abutment 46 by means of the retaining means 26 to be described in greater detail. It will be observed that the use of the resilient collar 58 results in a resilient mounting of the tread 60 to thereby extend its life. Moreover, the removability of both flanges and the tire tread assembly 24 permits ready servicing in the field thereby minimizing servicing cost.

Turning now to the retaining means 26, each is in the form of a cap 62 having an interior threaded surface 64 for receipt on a threaded end 44 of the hub 20. When so received, a lip 66 radially outwardly of the threaded surface 64 and extending axially inwardly from the body of the cap 62 will engage the corresponding one of the guide flanges 50 in the annular notch 54 thereof, although in some instances, an annular shim 68 may be interposed therebetween.

Radially inwardly of the threaded surface 64 is an axially, inwardly directed, integral, annular ring 70 having a radially extending surface 72 in alignment with the corresponding one of the shoulders 38 on the shaft 10. Interposed between the surface 72 and the shoulder 38 is a composite, annular thrust bearing 74 which preferably is steel-backed bronze. The thrust bearing 74 may be held in place either on the surface 72 or on the shoulder 38 by means of a plurality of radially spaced pins 80. Disposition on the surface 72, as illustrated, is preferred from a servicing standpoint.

From the foregoing, it will be appreciated that when both caps 62 are secured to opposite ends of the hub 20, they not only properly locate the guide flanges and the tread assembly, but locate the hub 20 properly on the shaft 10 as well. In the event desired clearances between the surfaces 72 and shoulders 38 are not achieved upon initial assembly (preferably, an optimum range of 0.010 to 0.020 inches of end play is desired), shims 68 of varying thicknesses may be employed to achieve optimum conditions.

In order to facilitate ready installation and removal of the caps 62, the radially outward periphery of each may be provided with a plurality of radially directed bores 82 for receipt of a spanner tool. In addition, axially extended, threaded through bores 84 may be provided for receipt of set screws 86 which may bear against the ends of the hub 20 to vastly increase the friction in the threaded connection between the cap 62 and the hub 20 to the point that inadvertent disassembly cannot occur during use.

The interior of each end of the hub 20 is provided with a peripheral groove 87 for receipt of a toric seal ring 88 to establish a seal between the hub and the ring 70 axially outwardly of the thrust bearing 74. In addition, sealing means, generally designated 90, are located radially inwardly of each of the surfaces 72 and axially outwardly thereof. Each sealing means includes a toric or seal ring 92 for sealing purposes as well as two seal rings 94 and 96. The seals 90 sealingly engage the shaft at the ramp 40. For a more thorough understanding of the construction and purposes of the seals 90, reference may be had to the commonly assigned application of Maguire et al, entitled "Face-Type Sealing Ring With Inner Seal Band," Ser. No. 440,648, and filed Feb. 8, 1974.

From the foregoing, it will be appreciated that a track roller assembly made according to the invention achieves the objects previously set forth. The reversibility of the guide flanges effectively doubles their useful life without a substantial increase in their cost, while the use of resilient collars 58 extends the useful life of the treads 60. Use of the caps 62 as retaining means for both locating the guide flanges and tread assemblies as well as locating the hub properly on the shaft also minimizes fabrication cost and yet allows the track roller assembly to be easily serviced in the field.

We claim:

1. A track roller assembly comprising:
   a shaft adapted to be secured to the track frame of a vehicle;
   a hub journalled on said shaft;
   at least two removable guide flanges disposed on said hub, each said guide flange being symmetrical whereby when one side thereof becomes worn, the same may be removed, reversed and replaced;
   a pair of abutments on said hub;
   a pair of removable spacing sleeves on said hub, one associated with each abutment;
   a pair of resilient collars, each extending peripherally about and mounted on a corresponding one of said sleeves;
   a pair of treads, each extending peripherally about and mounted on a corresponding one of said collars,
   said guide flanges being in abutment with a corresponding one of said sleeves oppositely from the corresponding abutment; and
   means for securing said guide flanges in assembled relation with said hub.

2. A track roller assembly according to claim 1 wherein opposite ends of said hub are externally threaded and wherein said securing means comprise a pair of internally threaded caps received on respective hub ends and engaging a corresponding guide flange.

3. A track roller assembly according to claim 2 wherein said shaft includes an enlarged diameter central portion journalling said hub and defined by spaced, radially extending, outwardly facing shoulders; said caps including annular, inwardly directed surfaces; and means defining thrust bearings interposed between said surfaces and corresponding ones of said shoulders.

4. A track roller assembly according to claim 3 further including annular sealing means radially inwardly and outwardly of said surfaces for sealingly engaging said shaft and said hub respectively axially outwardly of said thrust bearings.

5. A track roller assembly comprising:
a shaft adapted to be secured to the track frame of a vehicle and having oppositely facing annular shoulders;
a hub journalled on said shaft and having exteriorly threaded ends;
at least two guide flanges disposed on said hub;
a pair of abutments on said hub for locating said flanges on said hub;
a pair of treads, each extending peripherally about said hub and engaging a corresponding one of said guide flanges; and
a pair of securing caps each having a threaded interior received on a corresponding end of said hub and engaging a corresponding one of said flanges;
each said cap further including an inwardly facing surface radially inwardly of said threaded interior for engaging the corresponding annular shoulder on said shaft.

6. A track roller assembly according to claim 5 wherein annular seals are disposed on opposite sides of said surfaces and sealingly engage said hub and said shaft.

7. A track roller assembly according to claim 5 wherein resilient collars are interposed between said treads and said hub.

8. A track roller assembly comprising:
a shaft adapted to be secured to the track frame of a vehicle and having oppositely facing annular shoulders;
a hub journalled on said shaft and having exteriorly threaded ends;
at least two removable guide flanges disposed on said hub, each said guide flange being symmetrical whereby when one side thereof becomes worn, the same may be removed, reversed and replaced;
a pair of abutments on said hub;
a pair of removable spacing sleeves on said hub, one associated with each abutment;
a pair of resilient collars, each extending peripherally about and mounted on a corresponding one of said sleeves;
a pair of treads, each extending peripherally about and mounted on a corresponding one of said collars,
said guide flanges being in abutment with a corresponding one of said sleeves oppositely from the corresponding abutment;
a pair of securing caps each having a threaded interior received on a corresponding end of said hub and engaging a corresponding one of said flanges;
each said cap further including an inwardly facing surface radially inwardly of said threaded interior for engaging the corresponding annular shoulder on said shaft;
a pair of seals located radially inwardly and radially outwardly of each of said surfaces for sealingly engaging said shaft and said hub respectively; and
thrust bearings interposed between said surfaces and said shoulders.

* * * * *

UNITED STATES PATENT OFFICE
CERTIFICATE OF CORRECTION

PATENT NO. : 3,910,128
DATED : October 7, 1975
INVENTOR(S) : Roger L. Boggs et al It is certified that error appears in the above—identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this

*third* Day of *February 1976*

[SEAL]

*Attest:*

RUTH C. MASON
*Attesting Officer*

C. MARSHALL DANN
*Commissioner of Patents and Trademarks*